Patented Aug. 10, 1948

2,446,797

UNITED STATES PATENT OFFICE 2,446,797

CATALYTIC OXIDATION OF HALOGENATED HYDROCARBONS

William E. Vaughan and Frederick F. Rust, Berkeley, Calif., assignors to Shell Development Company, San Francisco, Calif., a corporation of Delaware No Drawing. Application February 20, 1946, Serial No. 649,115

16 Claims. (Cl. 260—610)

The present invention relates to the treatment of halogenated branched-chain hydrocarbons, and more particularly pertains to the production of certain valuable compounds, some of which are novel, by controlled, non-explosive catalytic oxidation of halogenated hydrocarbons which contain at least one saturated tertiary carbon atom and also contain one or more halogen atoms of atomic No. 9 to 35. In one of its more specific embodiments, the present invention is directed to controlled oxidation of isobutyl chloride or bromide whereby there is produced chloro or bromo tertiary-butyl hydroperoxide, respectively, as well as the corresponding halogenated alcohols. The organic hydroperoxides and alcohols produced in accordance with this invention have the same number of carbon atoms in the molecule as the starting material.

The oxidation of various hydrocarbons has been effected for a number of years both non-catalytically and in the presence of various catalysts. As a general rule, most, if not all, of these oxidations resulted in considerable decomposition of the hydrocarbons, i. e. cleavage of carbon-to-carbon bonds of the organic starting material. Also, the products of reaction of such oxidations contained various percentages of hydrocarbons which have been oxidized to a greater or lesser extent. For instance, the catalytic oxidation of paraffinic hydrocarbons in accordance with the teachings of the prior art formed mixtures containing various percentages of carbon monoxide, carbon dioxide, olefins, water, as well as some aldehydes, alcohols, acids, acetals, esters, ketones and other hydrocarbon-oxygen compounds. Similarly, the catalytic oxidation of aromatic hydrocarbons, e. g. toluene, in accordance with the teachings of the prior art frequently formed mixtures containing various percentags of saturated and unsaturated hydrocarbons, saturated and unsaturated aliphatic and aromatic aldehydes, ketones, lactones, alcohols and other oxygenated compounds such as carbon dioxide. Furthermore, these various oxygenated compounds formed during the oxidation of various hydrocarbons, according to the teachings of the prior art, usually contained varied numbers of carbon atoms per molecule owing to scission of carbon-to-carbon bonds, as well as to other side reactions such as polymerization, condensation and the like. Although most of the oxygenated organic compounds formed as a result of partial oxidations of hydrocarbons are generally more valuable than the primary materials subjected to the oxidation reaction, the subsequent fractionations of the reaction mixtures and the recovery of the individual compounds therefrom are frequently very difficult, if not commercially impossible, or at least greatly increases the cost of the final product or products.

It is frequently desirable to obtain predominantly carboxylic acids, organic peroxides (including organic hydro-peroxides), alcohols, and/or ketones rather than mixtures containing them and large amounts of other oxygenated compounds, e. g. carbon dioxide, carbon monoxide, aldehydes, lactones, and the like. Furthermore, it is usually important or desirable to obtain such oxygenated compounds having at least the same number of carbon atoms per molecule as the starting organic material. In all such cases the known methods of partial oxidation of hydrocarbons, whether they be catalytic or non-catalytic, are impractical because of the partial or complete decomposition of the starting organic materials to form carbon and compounds containing fewer carbon atoms per molecule, as well as due to the formation of mixtures of compounds which are oxygenated to a greater or lesser degree.

It is a principal object of the present invention to provide a novel process enabling halogenated hydrocarbons to be oxidized whereby high yields of predetermined oxygenated organic compounds containing halogen, some of which are novel, may be obtained. A further object of the invention is to provide a process for the production of high yields of halogenated organic peroxides and alcohols to the substantial exclusion of other oxygenated compounds. A still further object is to provide a process whereby halogenated hydrocarbons containing a tertiary carbon atom of aliphatic character may be oxidized to produce predominantly the corresponding halogenated alcohols and hydroperoxides having the same number of carbon atoms as the starting material. Another object is to provide a process for controlled catalytic oxidation of halogenated hydrocarbons containing a saturated tertiary carbon atom to produce valuable and novel halogenated hydrocarbon hydroperoxides. Still other objects will be apparent from the description of the invention.

In our copending applications Serial No. 474,224, filed January 30, 1943, now U. S. Patent No. 2,395,523, and Serial Nos. 510,420 and 510,421, filed November 15, 1943, now U. S. Patent Nos. 2,403,771 and 2,403,772, of which the present application is a continuation-in-part, we have described the controlled oxidation of hydrocarbons like isobutane with oxygen in the presence of hydrogen bromide, whereby there are produced organic peroxides like tertiary-butyl hydroperoxide and di-tertiary-butyl hydroperoxide. We have now discovered that halogenated hydrocarbons containing a saturated tertiary carbon atom with one or more like or different halogen atoms of atomic No. 9 to 35 linked to other carbon atoms than the tertiary carbon atom can be oxidized to valuable compounds by the partial and controlled oxidation in the presence of added hydrogen bromide as catalyst. In one of its more specific embodiments the invention resides in the production of chlorinated or brominated peroxides and hydroperoxides by subjecting chlorinated or brominated hydrocarbons containing a tertiary carbon atom of aliphatic character to the action of oxygen or an oxygen-containing or oxygen-yielding material in the presence of hydrogen bromide, this oxidation being effected at temperatures and pressures below those capable of causing spontaneous combustion and thereby the resultant decomposition of the structure of the starting halogenated hydrocarbon.

The above outlined invention is predicated on our discovery that the presence of added hydrogen bromide during the oxidation of the defined class of halogenated hydrocarbons controls the oxidation reactions so that oxidation occurs predominantly on the carbon atom or atoms to which a halogen atom would usually attach itself if the starting compound were subjected to a halogen substitution reaction, i. e. oxidation will occur upon the tertiary carbon atom having the replaceable hydrogen atom linked directly thereto. Furthermore, it has been found that the presence of hydrogen bromide, besides retarding the explosion or complete combustion of the starting material, has the effect of inhibiting decomposition of the carbon structure of such starting materials so that the resulting oxygenated compounds contain at least the same number of carbon atoms per molecule as the starting material.

As stated, the halogenated hydrocarbons which may be oxidized in accordance with the process of the present invention contain a tertiary carbon atom of aliphatic character and may therefore be represented generally by the formula

wherein each R represents a like or different alkyl, aryl, alicyclic or aralkyl radical, two of which may be joined together to form an alicyclic ring, and one or more of which are substituted with halogen atoms of atomic No. 9 to 35, i. e. fluorine, chlorine and/or bromine. The preferred class of halogenated hydrocarbons which may be used as the starting material comprises chlorinated or brominated saturated aliphatic hydrocarbons containing at least one tertiary carbon atom and having the halogen atom or atoms attached to one or several carbon atoms of the various alkyl radicals attached to the tertiary carbon atom, which latter carries a replaceable hydrogen atom. These halogenated hydrocarbons may contain one or more chlorine or bromine atoms or combination of them. The following is a non-limiting list of representative chlorinated and/or brominated saturated aliphatic hydrocarbons containing at least one tertiary carbon atom having a hydrogen atom linked directly thereto which may be oxidized according to the process of the invention: 1-chloro-2-methyl propane (isobutyl chloride), 1-bromo-2-methyl propane (isobutyl bromide), 1,1-dichloro-2-methyl propane, 1,1-dibromo-2-methyl propane, 1-chloro-1-bromo-2-methyl propane, 1-chloro-2-chloromethyl propane, 1-chloro-2-bromomethyl propane, 1-chloro-3-methyl butane (isoamyl chloride), 1-chloro-2-methyl butane, 1-bromo-3-methyl butane, 1,2-dichloro-3-methyl butane, 1,2-dichloro-2,3-dimethyl butane, 1-bromo-4-methyl pentane, 2 - chloromethyl - 1 - chloro - 3-methyl pentane and the like, together with their homologues. The fluorine-containing aliphatic hydrocarbons having a saturated tertiary hydrocarbon therein are also suitable, although less preferred. Among representative examples of this class are such compounds as 1-fluoro-2-methyl propane, 1-chloro-1-fluoro-2-methyl propane, 1-fluoro-3-methyl butane, 1-bromo-1-fluoro-3-methyl butane, 2-fluoro-3-methyl butane, 1,1-difluoro-2-methyl propane and the like, together with their homologues. The fluorine-containing hydrocarbons referred to in the present application can be prepared from self-evident appropriate starting materials by addition of hydrogen fluoride to compounds containing an aliphatic double bond, or by treating the corresponding chlorinated compound with hydrogen fluoride whereby fluorine atoms are substituted for chlorine atoms according to the general methods described in Jour. Am. Chem. Soc., vol. 67, pages 1194 to 1199. Also, one or more of the aliphatic radicals attached to the tertiary carbon atom may be substituted by alkyl, aralkyl, or alicyclic hydrocarbon radicals, one or more of which contains chlorine, bromine, and/or fluorine, reference being made, for example, to such compounds as 1-chloro-2-phenyl propane, 1-bromo-2-benzyl propane, 1-chloro-2-naphthyl propane, 1-chloro-2-tolyl propane, 1-chloro-2-methyl-3-phenyl butane, 2-chlorophenyl propane, 1-chloro-2-cyclohexyl propane, 1,1-dichlorophenyl-2,2,2-trichloroethane, 1-fluoro-2-phenyl propane, 1-chloro-1-fluoro-2-phenyl propane, 2-fluoro-3-cyclohexyl butane and the like, as well as their homologues.

Instead of employing individual members of the above-mentioned class of halogenated hydrocarbons containing at least one tertiary carbon atom of aliphatic character, the present process is also applicable, at least in some instances, to the controlled oxidation of mixtures of compounds of this class, as well as mixtures containing one or more of the compounds of the above-defined class, together with one or more other organic compounds such as hydrocarbons like isobutane, etc. The oxidation of such mixtures, when effected in accordance with the process of the present invention, results in the production of mixtures containing the corresponding peroxides and hydroperoxides.

It was stated above that the slow (i. e. non-explosive) controlled oxidation of the above-outlined class of halogenated hydrocarbons is effected in accordance with the present invention at temperatures below those at which spontaneous combustion or substantial decomposition of the carbon structure occurs. This upper temperature limit will, at least in part, depend on the specific substance treated, as well as on the proportions thereof and of the oxygen and hydrogen bromide present in the vaporous mixture subjected to the elevated temperatures. Generally speaking, this upper temperature limit is in the neighborhood of about 200° C. However, some of the more stable organic compounds of the defined class may be heated together with oxygen and hydrogen bromide to higher temperatures, e. g. about 250° C. or sometimes even higher, particularly in the presence of inert diluents, without causing the mixture to decompose with the concurrent formation of high yields of carbon. In this connection it is to be noted that excessively high temperatures, even though they may be below the explosive region, should be avoided because of certain undesirable side reactions such as excessive conversion of the added hydrogen bromide to form organic bromides. This in itself is not detrimental because the organic bromides themselves may be treated in accordance with the present invention to form halogen-free oxygenated organic compounds and hydrogen bromide (so that in effect at least a portion of the hydrogen halide is regenerated and may be reused). Nevertheless, the excessive formation of organic bromides, during the controlled oxidation of a given compound, is undesirable because this decreases the catalyst concentration and therefore may affect the yield or output of the desired oxygenated product or products. As stated, the upper temperature limit is generally in the neighborhood of about 200° C. However, with shorter contact periods this temperature may be raised above the mentioned limit. Nevertheless, some of the more readily oxidizable compounds may be economically oxidized according to the present process at lower temperatures, e. g. about 150° C. and lower. With a further decrease in the operating temperature the output of desired product per unit of time will decrease so that at temperatures of below about 100° C. the controlled oxidation in the presence of hydrogen halides, or substances capable of yielding them under the operating conditions, may become uneconomical.

The reaction may be effected in the liquid or vapor phase, or in a two-phase liquid-vapor system. Since it is difficult to maintain a desirable relatively high oxygen concentration when the reaction is conducted in the liquid phase, it is generally preferable to effect the oxidation according to the present invention in the vapor phase. Since some of the relatively higher boiling halogenated hydrocarbons containing a tertiary carbon atom of aliphatic character cannot be effectively maintained in the vapor phase and in contact with sufficient concentrations of oxygen and of hydrogen bromide without causing spontaneous combustion, the oxidation of such compounds may be readily effected in the presence of inert diluents such as steam, nitrogen, carbon dioxide, and even methane, which latter is relatively stable at temperatures at which the halogenated derivatives may be oxidized according to the invention. Of the above diluents, the use of steam is believed to be most advantageous because the hydrogen bromide may then be removed from the reaction mixture as an overhead fraction or distillate in the form of its constant boiling mixture of hydrogen bromide and water.

Although the volumetric ratios of the starting material to the oxygen may vary within relatively wide limits, it may be stated that satisfactory yields of the peroxides and/or hydroperoxides may be obtained by using equivolumetric quantities thereof. An increase in the ratio of oxygen to the halogenated hydrocarbon in the treated mixture may increase the yield of the hydroperoxides containing the same number of carbon atoms per molecule as the treated organic compound. Any undue increase in this ratio is generally dangerous because of excessive explosion hazards. On the other hand, the use of oxygen-to-halogenated hydrocarbon ratios considerably below equivolumetric will lower the output of the desired organic peroxides per unit of time because of the presence of less oxygen per unit of space. This renders the process less economical. However, the process is still operable and, in fact, it must be noted that a lowering of the oxygen-to-halogenated hydrocarbon ratio may cause a more rapid consumption of oxygen per unit of time. It was stated above that satisfactory yields of the desired oxygenated compounds may be obtained when equivolumetric mixtures of oxygen and the specified organic starting material containing a tertiary carbon atom of aliphatic character are subjected to the action of hydrogen bromide at the operating temperature specified herein. Such mixtures usually present no hazards as far as explosions are concerned, the hydrogen bromide apparently acting as an explosion retardant or inhibitor.

The invention may be executed in a batch, intermittent or continuous manner. When operating in a continuous system, all of the reactants as well as the diluents, if diluents are used, and the catalyst may be first mixed together, and the mixture may then be conveyed through the whole length of the reaction zone. In the alternative, it is possible to introduce at least a portion of the catalyst and/or of one or both of the reactants, i. e. oxygen and the halogenated hydrocarbon subjected to oxidation, at various intermediate points along the reaction zone. Such operation may be frequently desirable to control the operating conditions in the reaction zone. Generally, the contact time may vary within relatively wide limits and is at least in part dependent on the other operating conditions such as specific starting material, the ratios thereof to the oxygen and/or the catalyst, the presence or absence of inert diluents, the operating temperatures and pressures, etc. In a continuous system it has been found that satisfactory yields of the desired oxidation products may be obtained with contact periods of between about 1 and about 3 minutes. Nevertheless, shorter or longer contact times may also be employed, particularly dependent on the specific material treated and the hydrogen bromide concentration in the reaction mixture.

Instead of using pure or substantially pure oxygen for the oxidation in accordance with the process of the present invention, it is also possible to employ oxygen-containing mixtures, such as air, or even substances capable of yielding molecular oxygen under the operating conditions.

The following examples will further illustrate various phases of the present invention, it being understood that the invention is not restricted to said examples but is coexclusive in scope with the appended claims.

*Example I*

The reactor consisted of a coil of glass tubing having an internal diameter of 25 mm. This coil, having a volume of about 3 liters, was immersed in an oil bath fitted with a thermostat which provided accurate control of the reaction temperature. The feed to the reactor was preheated, mixed and then conveyed through the reactor at a temperature of about 170° C. under substantially atmospheric pressure. Measured in volumes of vapor at normal temperature and pressure (20° C. and 1 atmos.), feed was conveyed into the reactor at the following rates: isobutyl chloride, 275 cc. per minute; oxygen, 275 cc. per minute; and hydrogen bromide, 45 cc. per minute. From the reactor the reaction products were conveyed through water to separate the water-soluble compounds from the water-insoluble phase. The latter was collected and extracted further with water to effect substantially complete removal of water-soluble compounds. This water-extract was combined with the first extract and subjected to extraction with tertiary butyl chloride for removal of the chloro-tertiary-butyl hydroperoxide. The latter compound was obtained from the tertiary butyl chloride by distillation in vacuo.

By recovery and analysis of the reaction products, the material balance given below was obtained.

| Product | Mols | Isobutyl Chloride Equivalent, Mols | Oxygen Equivalent, Mols |
| --- | --- | --- | --- |
| Chloro-tertiary-butyl hydroperoxide | 0.563 | 0.563 | 0.563 |
| Isobutylene chlorhydrin | 0.521 | 0.521 | 0.260 |
| Haloacetone | 0.062 | 0.047 | 0.031 |
| Isobutyric acid | 0.116 | 0.116 | 0.116 |
| Water | 0.706 | | 0.353 |
| Hydrogen halide | 0.239 | | |
| Carbon dioxide | 0.018 | 0.005 | 0.018 |
| Carbon monoxide | 0.097 | 0.024 | 0.049 |
| Oxygen | 1.056 | | 1.056 |
| Isobutyl chloride | 1.450 | 1.450 | |
| Isobutylene dibromide | 0.070 | 0.070 | |
| Output | | 2.796 | 2.446 |
| Input | | 2.790 | 2.600 |
| Unaccounted for ___ per cent | | 0 | 5.9 |

From the foregoing material balance, the following conversions and yields were obtained:

Per cent
Isobutyl chloride converted _____ 48
Oxygen converted _____ 59
Conversion of isobutyl chloride to chloro-tertiary - butyl hydroperoxide _____ 20
Conversion of oxygen to chloro-tertiary-butyl hydroperoxide _____ 22
Yield of chloro-tertiary-butyl hydroperoxide based on isobutyl chloride _____ 42
Yield of chloro-tertiary-butyl hydroperoxide based on oxygen _____ 36

When an equivolumetric vaporous mixture of isobutyl chloride is subjected to the same operating conditions as described above, but in the absence of added hydrogen bromide catalyst, no reaction occurs. Only by raising the temperature far in excess of that employed with the hydrogen bromide can oxidation be made to occur and, even then, production of oxygenated compounds, other than carbon monoxide, carbon dioxide and water, is relatively small.

*Example II*

The chloro-tertiary-butyl hydroperoxide, obtained as described in the previous example by distilling off the tertiary butyl chloride from the extract and then distilling the hydroperoxide in vacuo, gave a fraction boiling at 50° C. to 61° C. at 2 mm. pressure which contained about 91.5% of the hydroperoxide. The refractive index was $n_D^{20} = 1.4452$. The monochloro-tertiary-butyl hydroperoxide is a colorless liquid having the structural formula:

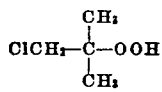

*Example III*

The reactor described in Example I was employed to effect catalytic oxidation of isobutyl bromide at a temperature of about 160° C. The vaporous feed was introduced at the rate of 275 cc. per minute of isobutyl bromide, 275 cc. per minute of oxygen and 50 cc. per minute of hydrogen bromide. The products were recovered as previously described except that the aqueous water extract was extracted with ether instead of tertiary butyl chloride in order to recover the bromo-tertiary-butyl hydroperoxide. The material balance was as follows:

| Product | Mols | Isobutyl Bromide Equivalent, Mols | Oxygen Equivalent, Mols |
| --- | --- | --- | --- |
| Bromo-tertiary-butyl hydroperoxide | 0.021 | 0.021 | 0.021 |
| Bromohydrin | 0.246 | 0.246 | 0.123 |
| Dibromides | 0.061 | 0.061 | |
| Bromoketone | 0.035 | 0.035 | 0.018 |
| Water | 0.444 | | 0.222 |
| Hydrogen bromide | 0.062 | | |
| Oxygen | 0.242 | | 0.242 |
| Isobutyl bromide | 0.292 | 0.292 | |
| Output | | 0.655 | 0.262 |
| Input | | 0.680 | 0.690 |
| Unaccounted for ___ percent | | 4 | 9 |

The monobromo-tertiary-butyl hydroperoxide produced had the structural formula:

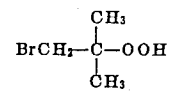

and was demonstrated to have been formed in the following manner. The presence of peroxidic oxygen was shown by treating a sample with potassium iodide acidified with 50% sulfuric acid and, after standing about 15 minutes under carbon dioxide, titrating the released iodine with sodium thiosulfate. Another sample of the bromo hydroperoxide was mixed with an excess of an equimolecular mixture of tertiary butyl alcohol and 65% sulfuric acid. After standing for 72 hours at temperatures of 15° C. to 30° C., a second phase which appeared was removed. It was a water-insoluble liquid having a refractive index (20/D) of 1.4448 and the ability to oxidize like other peroxides. Analysis showed 38.4% bromine compared with 35.6% calculated for the expected mono-bromo-di-tertiary-butyl peroxide

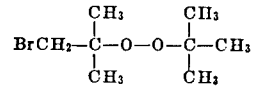

*Example IV*

The oxidation of isobutyl bromide was repeated as described in the above example except that there was used a temperature of about 180° C. and half the amount of hydrogen bromide catalyst, namely, 25 cc. per minute. The material balance was as follows:

| Product | Mols | Isobutyl Bromide Equivalent, Mols | Oxygen Equivalent, Mols |
| --- | --- | --- | --- |
| Bromo-tertiary-butyl hydroperoxide | 0.038 | 0.038 | 0.038 |
| Bromohydrin | 0.138 | 0.138 | 0.069 |
| Dibromides | 0.085 | 0.085 | |
| Bromoketone | 0.016 | 0.012 | 0.008 |
| Water | 0.277 | | 0.138 |
| Gaseous Hydrocarbon ($C_2H_6$) | 0.017 | 0.009 | |
| Carbon dioxide | 0.016 | 0.004 | 0.016 |
| Carbon monoxide | 0.051 | 0.013 | 0.026 |
| Hydrogen bromide | 0.079 | | |
| Isobutyl bromide | 0.224 | 0.224 | |
| Oxygen | 0.188 | | 0.188 |
| Output | | 0.523 | 0.481 |
| Input | | 0.518 | 0.518 |
| Unaccounted for ___ percent | | 0 | 7 |

In like manner the other hereinbefore outlined halogenated hydrocarbons containing a tertiary carbon atom of aliphatic character to which is linked directly a replaceable hydrogen atom can be oxidized to useful products in the presence of deliberately added hydrogen bromide as catalyst. When the halogenated hydrocarbon is one having the chlorine or bromine atom linked to the carbon atom directly adjacent to the tertiary carbon atom, as is the case in isobutyl chloride, the principal oxygenated products will be the corresponding halogenated hydroperoxide and halogenated alcohol. The formation of halogenated hydroperoxides rather than peroxides appears to be favored by the proximity of the halogen to the replaceable hydrogen atom linked to the tertiary carbon atom. By using as reactant a compound having the halogen atom or atoms attached to the carbon atom at least once removed from the tertiary carbon atom, di(halogenated hydrocarbon) peroxides are produced by the process. In such compounds the effect of the halogen atom on the type of oxidation which occurs on the tertiary carbon atom is diminished or eliminated. Thus, such a compound as isoamyl chloride can be subjected to the process of the invention and there is produced both chloro-di-tertiary-amyl peroxide and chloro-tertiary-amyl-hydroperoxide.

Although the amount of added hydrogen bromide employed as catalyst may be varied over wide limits in the broad concept of the invention, the proportion of hydrogen bromide has an effect on the nature of the products produced when the halogenated compound used as reactant has the halogen atom attached to a carbon atom one or more carbon atoms removed from the tertiary carbon atom. In this connection the use of high concentrations of hydrobromide tends to favor production of high yields of the diperoxides, whereas with relatively lower hydrobromide concentrations, other conditions being maintained equal, the reaction mixture contains larger amounts of the hydroperoxides. Generally speaking, when a hydrogen bromide concentration is below about 10%, i. e., when such hydrogen bromide comprises less than 10% of the total mixture present in the reaction zone, the reaction product formed by such catalytic oxidation in accordance with the process of the present invention favors formation of hydroperoxides having the same number of carbon atoms per molecule as the starting material, and the use of higher hydrogen bromide concentrations results in the formation of reaction products containing proportionally greater amounts of the corresponding di-organic peroxides, i. e. peroxides in which each of the peroxy oxygen atoms is attached to a halogenated radical via a tertiary carbon atom of aliphatic character, these peroxides having twice as many carbon atoms per molecule as the organic material subjected to oxidation. When the volumetric or molal concentration of the hydrogen bromide in the reaction mixture subjected to oxidation is increased above about 20%, such an increase of the catalyst concentration does not have a marked effect on the percentage of oxygen which will react, or on the yield of the peroxides. Satisfactory yields of the desired organic hydroperoxides may be obtained in accordance with the process of the present invention when the hydrogen halide concentration is below the aforementioned 10%, and preferably between about 4% and 6%. However, higher or lower concentrations of the catalyst may be employed. In fact, the use of lower concentrations, e. g. about 2%, may be advantageous, particularly for the treatment of certain of the starting materials containing a tertiary carbon atom of aliphatic character. At least a substantial proportion of hydrogen bromide is used, i. e. at least 1%. Also, the use of superatmospheric pressures tends to favor the formation of the desired hydroperoxides so that comparable yields of the desired peroxides may be obtained with lower hydrogen bromide concentrations when the reaction is effected at superatmospheric pressures. It must be noted that even with relatively high hydrogen bromide concentrations, i. e. those above 10 mol per cent and even those approaching or exceeding 20 mol per cent, some hydroperoxides will be formed when using a material like isoamyl chloride. Nevertheless, as stated, the increase in the catalyst concentration tends to favor the formation of peroxides containing two organic radicals attached to the peroxy oxygen atoms.

It was pointed out that the yields of the hydroperoxides can be increased with certain reactants when the reaction is effected at superatmospheric pressures. However, the process in general may also be effected at atmospheric or even subatmospheric pressures. The use of superatmospheric pressures is preferred not only because it permits the utilization of lower hydrogen bromide catalyst concentrations, but also because more of the mixture subjected to treatment may be conveyed through a given unit of reaction space per unit of time.

The halogenated hydroperoxides produced by the process are novel compounds not heretofore obtainable. Broadly, these compounds are halogen-substituted hydrocarbon hydroperoxides wherein the hydroperoxy radical (—OOH) is linked directly to a saturated tertiary carbon atom and the substituent halogen of atomic No. 9 to 35, of which there may be more than one, is linked directly to other carbon atoms. A preferred class is the monochloro- or monobromo-tertiary-alkyl hydroperoxides and the most preferred compounds are monochloro-tertiary-butyl hydroperoxide and monobromo-tertiary-butyl hydroperoxide which could not be produced prior to our invention owing to the peculiar influence of the halogen atom. United States Patent 2,223,807 describes the preparation of tertiary-butyl hydroperoxide by dissolving tertiary-butyl alcohol in strong sulfuric acid and then adding hydrogen peroxide whereby oxidation of the tertiary-butyl alcohol occurs to give the desired hydroperoxide. When monochloro-tertiary-butyl alcohol, i. e. isobutylene chlorhydrin, is substituted for tertiary-butyl alcohol and preparation of the hydroperoxide is attempted, it is not successful apparently owing to the peculiar effect of the halogen substituent. By use of the direct oxidation method of the present invention, these novel hydroperoxides can now be obtained.

The compounds of the invention can be represented by the formula:

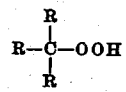

wherein each R represents a like or different alkyl, aryl, aralkyl or alicyclic radical, one or more of which contains halogen substituents of atomic No. 9 to 35. Some representative examples include such compounds as: 1-chloro-2-methyl - 2 - hydroperoxy propane, 1-bromo-2-methyl-2-hydroperoxy propane, 2-chloromethyl-2-hydroperoxy butane, 2-bromomethyl-3-methyl-2-hydroperoxy butane, 1,1-dichloro-2-methyl-2-hydroperoxy propane, 2-chloro-3-methyl-3-hydroperoxy butane, 1-fluoro-2-methyl-2-hydroperoxy propane, 2-fluoro-3-methyl-3-hydroperoxy butane, 1-chloro-3-methyl-3-hydroperoxy butane, 1-fluoro-1-chloro-2-methyl-2-hydroperoxy propane, 1-chloro-4-methyl-4-hydroperoxy hexane, 1,1,1-trichloro-2-methyl-2-hydroperoxy propane, 2-chloro-2-fluoro-3-methyl-3-hydroperoxy butane, 1-chloro-2-naphthyl-2-hydroperoxy propane, 2-chlorophenyl-2-hydroperoxy propane, 1-chloro-2,3-dimethyl-2,3-dihydroperoxy butane, 1-chloro-2-chloromethyl-2-hydroperoxy propane, 1-chloro-2-bromomethyl-2-hydroperoxy propane, 1-chloro-2-phenyl-2-hydroperoxy propane, 1-fluoro-2-phenyl-2-hydroperoxy butane, 1-chloro-2-cyclopentyl-2-hydroperoxy propane, and the like, together with their homologues and further halogen substitution products of chlorine, bromine and/or fluorine. Preferably the compounds contain not more than six carbon atoms. In general, the lower compounds produced by the process are liquid materials which have some water solubility although the higher products are crystalline solids and are less soluble.

The products can be recovered from the reaction mixture by ordinary distillation procedures, preferably under suitably reduced pressures, since the peroxides and hydroperoxides are characterized by remarkable stability in contrast to peroxides and hydroperoxides not having the peroxy or hydroperoxy groups linked to a tertiary carbon atom and which are subject to violent explosions upon being heated or subjected to shock. In addition, the lower water-soluble hydroperoxides of the invention can be recovered by extracting the reaction mixture with water. This extract may also contain the halogenated alcohol produced. By extracting the water extract again with ethers or halogenated hydrocarbons, a concentrate of the hydroperoxide can be obtained from which the hydroperoxide is secured by distillation.

The products of the invention are very useful materials in that their novel structure in the case of the peroxides and hydroperoxides enables their use in preparation of other valuable derivatives. Further, the peroxides and hydroperoxides can be used as polymerization catalysts, as additives to improve the cetane value of Diesel fuels, and as oxidizing agents such as for treating textile materials.

We claim as our invention:

1. A process for the production of organic halogen-containing peroxides which comprises reacting a vaporous mixture comprising oxygen and a halogen-substituted saturated hydrocarbon in the presence of added hydrogen bromide at an elevated temperature which is below the spontaneous combustion temperature of the mixture, said halogen-substituted hydrocarbon containing a saturated tertiary carbon atom having a hydrogen atom linked directly thereto and containing at least one substituent halogen of atomic No. 9 to 35, and recovering the peroxide from the reaction mixture thus formed.

2. The process according to claim 1 wherein an inert diluent is employed as a carrier to maintain the reactants in the vapor state.

3. A process for the production of organic halogen-containing peroxides which comprises reacting a vaporous mixture containing oxygen and a halogen-substituted saturated aliphatic hydrocarbon in the presence of added hydrogen bromide at a temperature between about 100° C. and the temperature at which spontaneous combustion of the reaction mixture occurs, said halogen-substituted hydrocarbon containing a saturated tertiary carbon atom having a replaceable hydrogen atom attached directly thereto and containing at least one substituent halogen of atomic No. 9 to 35, and recovering the peroxide from the reaction mixture thus formed.

4. A process for the production of a monohalogen-substituted tertiary-butyl hydroperoxide which comprises reacting a vaporous mixture comprising oxygen and an isobutyl monohalide in the presence of added hydrogen bromide at an elevated temperature which is below the spontaneous combustion temperature of the mixture, said isobutyl monohalide having the halogen atom therein of atomic No. 9 to 35, and recovering the monohalogen-substituted tertiary-butyl hydroperoxide from the reaction mixture.

5. A process for the production of monochloro-tertiary-butyl hydroperoxide which comprises reacting a vaporous mixture containing oxygen and isobutyl chloride in the presence of a substantial proportion amounting to at least 1% of added hydrogen bromide at a temperature between about 100° C. and the temperature at which spontaneous combustion of the mixture occurs, and recovering the monochloro-tertiary-butyl hydroperoxide from the reaction mixture thus formed.

6. A process for the production of monobromo-tertiary-butyl hydroperoxide which comprises reacting a vaporous mixture containing oxygen and isobutyl bromide in the presence of a substantial proportion amounting to at least 1% of added hydrogen bromide at a temperature between about 100° C. and the temperature at which spontaneous combustion of the mixture occurs, and recovering the monobromo-tertiary-butyl hydroperoxide from the reaction mixture thus formed.

7. A process for the production of monochloro-tertiary-butyl hydroperoxide which comprises reacting substantially equivolumetric vaporous amounts of oxygen and isobutyl chloride at substantially atmospheric pressure and at a temperature of about 150° C. to 200° C. in the presence of added hydrogen bromide employed in a substantial volumetric amount up to about one-half that of the isobutyl chloride, extracting the resulting reaction mixture with water, extracting the resulting extract with tertiary-butyl chloride, and separating the monochloro-tertiary-butyl hydroperoxide from the tertiary-butyl chloride by distillation.

8. A process for the production of monobromo-tertiary-butyl hydroperoxide which comprises reacting substantially equivolumetric vaporous amounts of oxygen and isobutyl bromide at substantially atmospheric pressure and at a temperature of about 150° C. to 200° C. in the presence of added hydrogen bromide employed in a substantial volumetric amount up to about one-half that of the isobutyl bromide, extracting the resulting reaction mixture with water, extracting the resulting extract with tertiary-butyl chloride, and separating the monobromo-tertiary-butyl hydroperoxide from the tertiary-butyl chloride by distillation.

9. In a process for the production of organic peroxides, the steps of subjecting vapors of a halogen-substituted saturated hydrocarbon containing a saturated tertiary carbon atom having a hydrogen atom linked directly thereto, and containing substituent halogen of atomic No. 9 to 35, to the action of oxygen in the presence of added hydrogen bromide and effecting the reaction at an elevated temperature which is below the spontaneous combustion temperature of the mixture.

10. In a process for the production of halogenated organic peroxides, the steps of subjecting vapors of an isobutyl monohalide having the halogen atom of atomic No. 9 to 35 to the action of oxygen in the presence of added hydrogen bromide and effecting the reaction at a temperature between about 150° C. and 200° C. under substantially atmospheric pressure.

11. A halogen-substituted hydrocarbon hydroperoxide wherein the hydroperoxy radical is linked directly to a saturated tertiary carbon atom, and the substituent halogen has an atomic number of 9 to 35 and is linked directly to carbon.

12. A halogen-substituted tertiary-alkyl hydroperoxide containing at least one halogen substituent of atomic No. 9 to 35.

13. A monohalogen-substituted tertiary-butyl hydroperoxide wherein the halogen substituent has an atomic number of 9 to 35.

14. A chloro-tertiary-butyl hydroperoxide.

15. Monochloro-tertiary-butyl hydroperoxide.

16. Monobromo-tertiary-butyl hydroperoxide.

WILLIAM E. VAUGHAN.
FREDERICK F. RUST.

REFERENCES CITED

The following references are of record in the file of this patent:

UNITED STATES PATENTS

| Number | Name | Date |
| --- | --- | --- |
| 2,395,523 | Vaughan et al. | Feb. 26, 1946 |
| 2,403,771 | Vaughan et al. | July 9, 1946 |
| 2,403,772 | Vaughan et al. | July 9, 1946 |